United States Patent
Escamilla et al.

(10) Patent No.: US 6,724,365 B1
(45) Date of Patent: Apr. 20, 2004

(54) SCROLL WHEEL DEVICE FOR PORTABLE COMPUTERS

(75) Inventors: Eduardo Escamilla, Round Rock, TX (US); Darin Lee Cepeda, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 09/668,495

(22) Filed: Sep. 22, 2000

(51) Int. Cl.$^7$ ................................................. G09G 5/08
(52) U.S. Cl. ..................... 345/157; 345/163; 345/164; 345/165
(58) Field of Search ................................ 345/163, 168, 345/684, 157, 165, 164

(56) References Cited

U.S. PATENT DOCUMENTS

| | | |
|---|---|---|
| 5,287,090 A | 2/1994 | Grant |
| 5,526,481 A | 6/1996 | Parks et al. |
| 5,530,455 A * | 6/1996 | Gillick et al. |
| 5,669,015 A | 9/1997 | Chidester et al. |
| 5,805,144 A | 9/1998 | Scholder et al. |
| 6,031,518 A | 2/2000 | Adams et al. |
| 6,046,728 A | 4/2000 | Hume et al. |
| 6,348,913 B1 * | 2/2002 | Cho |
| 6,380,927 B1 * | 4/2002 | Ostrum et al. |

* cited by examiner

Primary Examiner—Matthew C. Bella
Assistant Examiner—Hau Nguyen
(74) Attorney, Agent, or Firm—Haynes and Boone, LLP

(57) ABSTRACT

A portable notebook computer includes a base having an exterior surface. A keyboard is mounted on the exterior surface. A palmrest area is mounted on the exterior surface adjacent the keyboard. A scroll device is mounted in the exterior surface adjacent the palmrest area. The scroll device includes a first portion protruding from the exterior surface, and a second portion extending through the exterior surface and recessed into the base. The scroll device is bi-directionally rotatable relative to the exterior surface and resiliently depressible into the base.

8 Claims, 4 Drawing Sheets

SCROLL WHEEL DEVICE FOR PORTABLE COMPUTERS

BACKGROUND

The disclosures herein relate generally to computer systems, and more particularly a scroll wheel component built into a portable laptop computer.

Portable laptop computers do not have a scrolling device with a middle mouse button functionality. Middle mouse button functionality is useful for applications such as computer aided design (CAD) as well as other applications such as pan, zoom and horizontal scroll functions.

Currently, arrow scroll buttons, located below the track pad, are used to provide the applications mentioned above. However, arrow scroll buttons do not have middle mouse button functionality and therefore only provide arrow scrolling in the vertical direction.

A currently available mouse with a wheel and wheel button provides a scroll function by rolling the wheel forward to scroll up in a document, or rolling the wheel backward to scroll down in a document. Another function is an autoscroll function which permits the user to click or depress the wheel button to read a document while the document scrolls automatically. A user can pan through a document by clicking and holding the wheel button down. A zoom function is also provided to zoom-in for a close-up view of a document, or to zoom-out for a full view of document at a reduced size. The zoom function is accomplished by holding down the CTRL key and moving the wheel forward for zoom-in and backward for zoom-out. These and other functions, not discussed, are available with a mouse wheel and wheel button.

Examples of mouse devices with multiple input functionality are described below. In U.S. Pat. No. 5,287,090, a combined mouse and track ball are contained within an ergonomically designed housing or shell. The shell is curved to fit comfortably within the palm of the hand of an operator so that the forefinger and thumb are opposed to each other in a prehensile position. A single shell is operable by a left-handed or right-handed operator by rotation of a switch to change the alignment of the sensor pickups engaging the roller ball of the combined mouse and track ball. At least one switch plate extends across an upper surface of the shell for depression by a forefinger of the operator. The switch plate is pivoted about a central fulcrum so as to have a cursor shifted to a position above an icon located on a computer screen for depression of the switch plate and initiation of a computer function indicated.

In U.S. Pat. No. 6,031,518, a device comfortably supports the hand of the user while the thumb and fingers are associated with keys, a trackball, and a scrolling wheel carried on the device. The overall configuration of the device and the arrangement of these actuators permits the user to operate all of the functions provided by the actuators while the forearm is in a neutral posture zone between pronation and supination of the forearm, and the wrist and fingers are minimally extended and comfortably flexed, respectively.

Therefore, what is needed is an input device adjacent the keyboard for supplementing input functionality for a portable notebook computer.

SUMMARY

One embodiment, accordingly, provides a multi-function input device adjacent the keyboard and palmrest areas of a portable notebook computer. To this end, a computer has a base including an exterior surface. A keyboard is mounted on the exterior surface. A palmrest area is provided on the exterior surface adjacent the keyboard. A scroll member is mounted in the exterior surface adjacent the palmrest area. The scroll member includes a first portion protruding from the exterior surface, and a second portion extending through the exterior surface. The scroll member is bi-directionally rotatable relative to the exterior surface and resiliently depressible into the base.

A principal advantage of this embodiment is that the scroll member is located on the palm rest area adjacent the keyboard so that the user can quickly and easily switch between keyboard and scroll member input functions.

BRIEF DESCRIPTION OF THE DRAWING FIGURES

DETAILED DESCRIPTION

Figure 1:
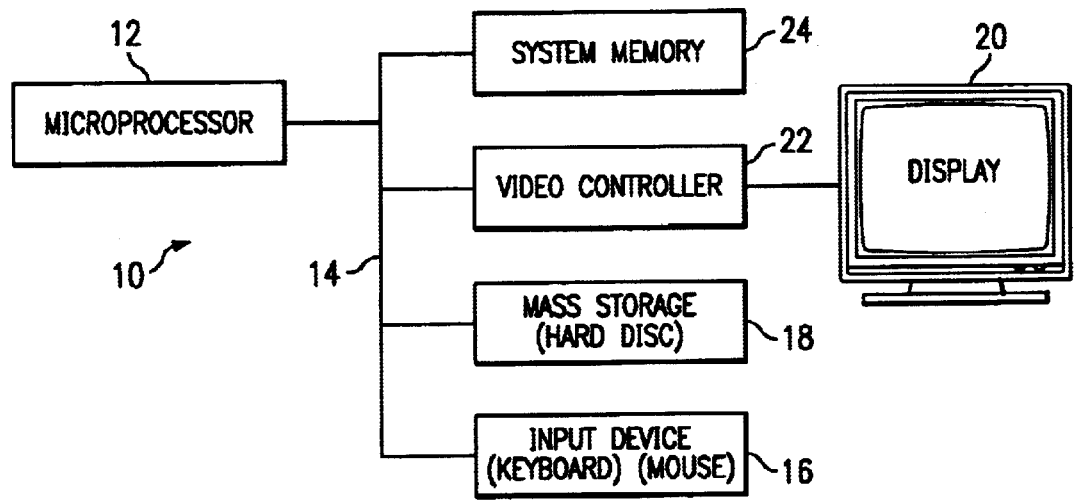
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
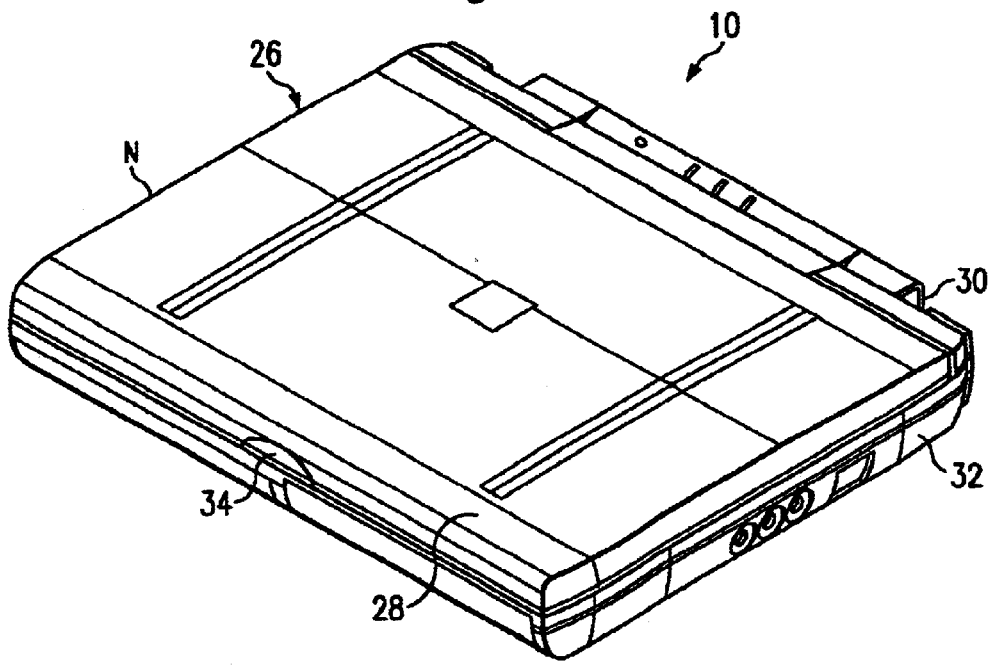
FIG. 2 is a perspective view illustrating an embodiment of a portable laptop computer having a lid in a closed position.
Figure 3:
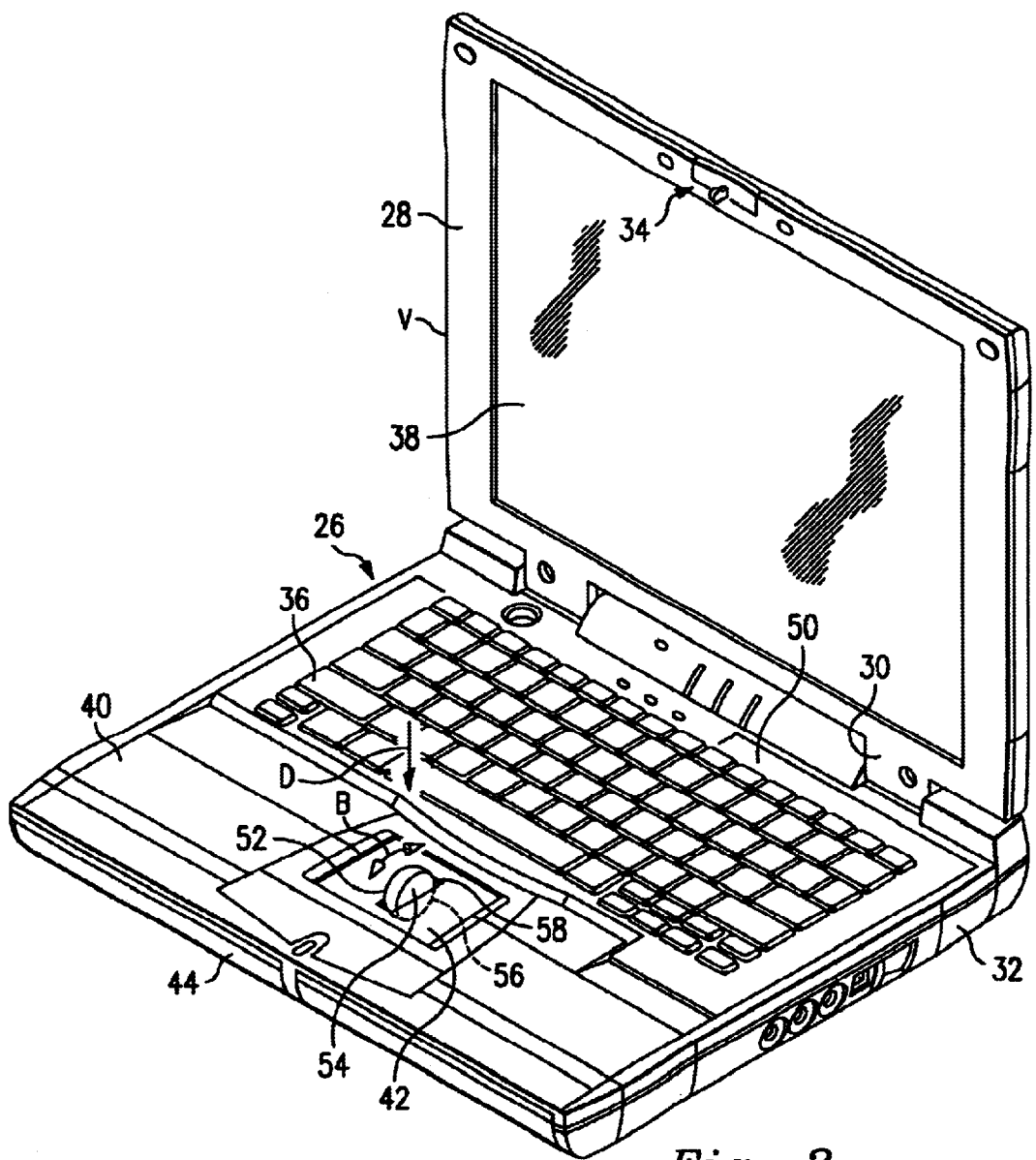
FIG. 3 is a perspective view illustrating an embodiment of a portable laptop computer having the lid in an open position.

Referring to FIG. 2, illustrated is a portable, notebook size computer designated 26 comprising a self-contained system, such as that illustrated at 10 in FIG. 1, and including a hinged top or lid 28 rotable about the hinge or hinges 30 from a nested position, "N," with a horizontal chassis base 32, to a substantially vertical or open position "V," FIG. 3. Opening of the notebook style portable computer by manipulation of a latch 34, reveals a plurality of input components such as a keyboard of keys 36 on base 32, and a monitor screen 38 mounted in lid or top 28. Base 32 includes a palm or wrist rest area 40 including the input system 16 having an input area 42 positioned above a battery housing 44 and adjacent keys 36.

Base 32 includes an exterior surface 50, FIG. 3. The keyboard keys 36 and also the adjacent palmrest area 40 are provided on the exterior surface 50. A scroll member 52 is mounted in the input area 42 of the exterior surface 50 adjacent the palmrest area 40. Scroll member 52 includes a first portion 54 protruding from the exterior surface 50, and a second portion 56 extending through an opening 58 formed in exterior surface 50. In this manner, second portion 56 is recessed into the base 32. The scroll member 52 is bi-directionally rotatable relative to the exterior surface 50, as indicated by the bi-directional arrow designated B, and is also resiliently depressible into the base 32, as indicted by the arrow designated D, and as will be discussed in greater detail below.

Figure 4:
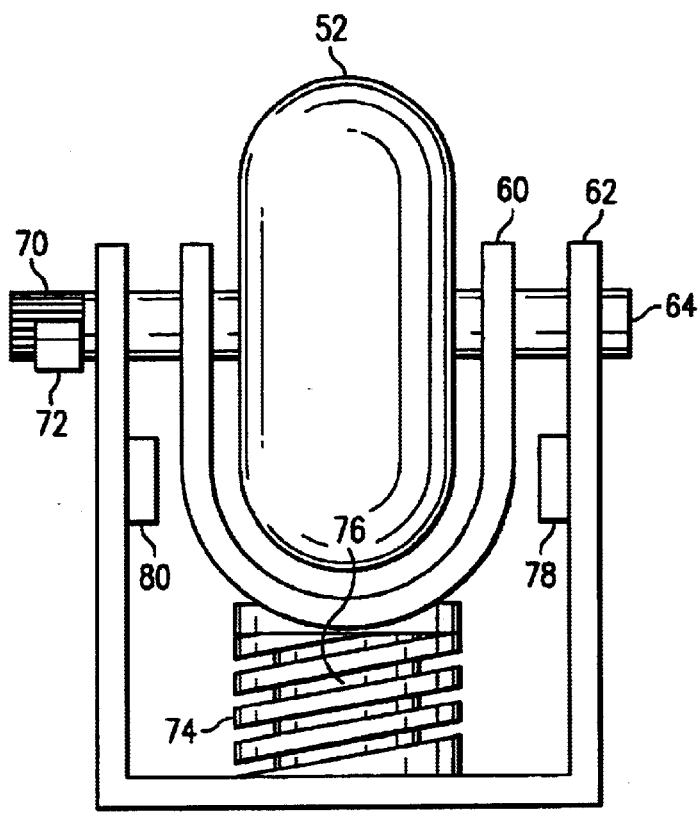
FIG. 4 is a frontal view illustrating an embodiment of a scroll member assembly.
Figure 5:
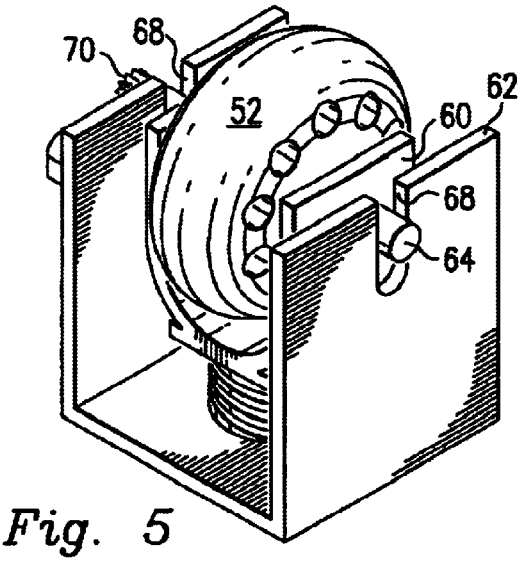
FIGS. 5 and 6 are perspective views further illustrating the embodiment of FIG. 4.
Figure 6:
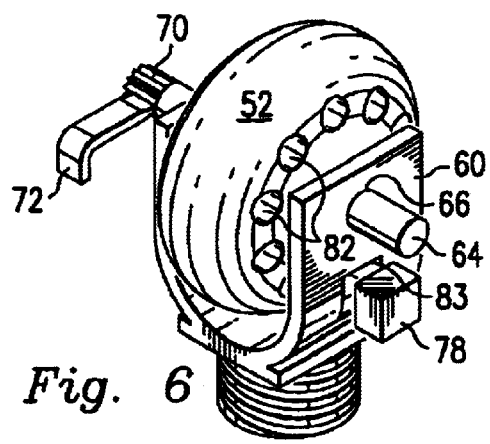

Scroll member 52, FIGS. 4, 5 and 6, is mounted in a first mounting bracket 60 and a second mounting bracket 62. An axle 64 extends through scroll member 52. Axle 64 is rotatably supported in an opening 66 formed in first mounting bracket 60. The axle 64 is rotatably and reciprocally mounted in a slot 68 formed in second mounting bracket 62. Axle 64 includes a plurality of teeth 70 formed thereon for engagement with a tactile probe 72 which may be supported on base 32 or on bracket 62.

A compression spring 74 is mounted on bracket 62 and is engaged with bracket 60 for urging bracket 60 away from bracket 62. A switch 76, mounted on bracket 62, engages bracket 60 when bracket 60 is depressed to compress spring 74. In this manner, bracket 60 is resiliently and reciprocally mounted in bracket 62. Functionally, scroll member 52 rotates relative to brackets 60 and 62, and reciprocates with bracket 60 relative to bracket 62.

A sensor 78 is mounted on bracket 62 adjacent scroll member 52. A frequency signal can be generated in response to a sensed rotation of scroll member 52 relative to sensor 78. Alternately, a second sensor 80 can be mounted on bracket 62 opposite sensor 78, a plurality of openings 82 may be provided in scroll member 52, and an aligned opening 83 may be provided in bracket 60, thus permitting a frequency signal to be generated in response to a sensed rotation of scroll member 52.

Figure 7:
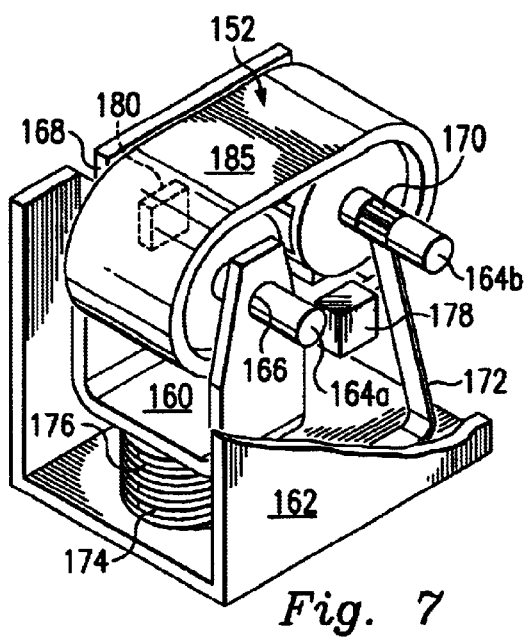
FIG. 7 is a perspective view illustrating another embodiment of a scroll member assembly.
Figure 9:
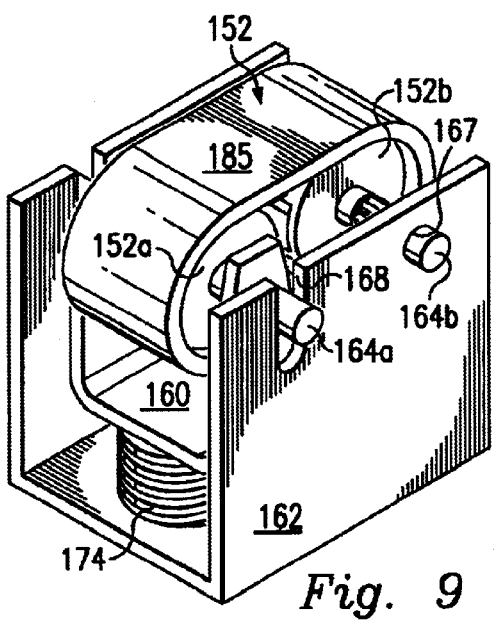
FIG. 9 is a perspective view further illustrating the embodiment of FIG. 7.
Figure 8:
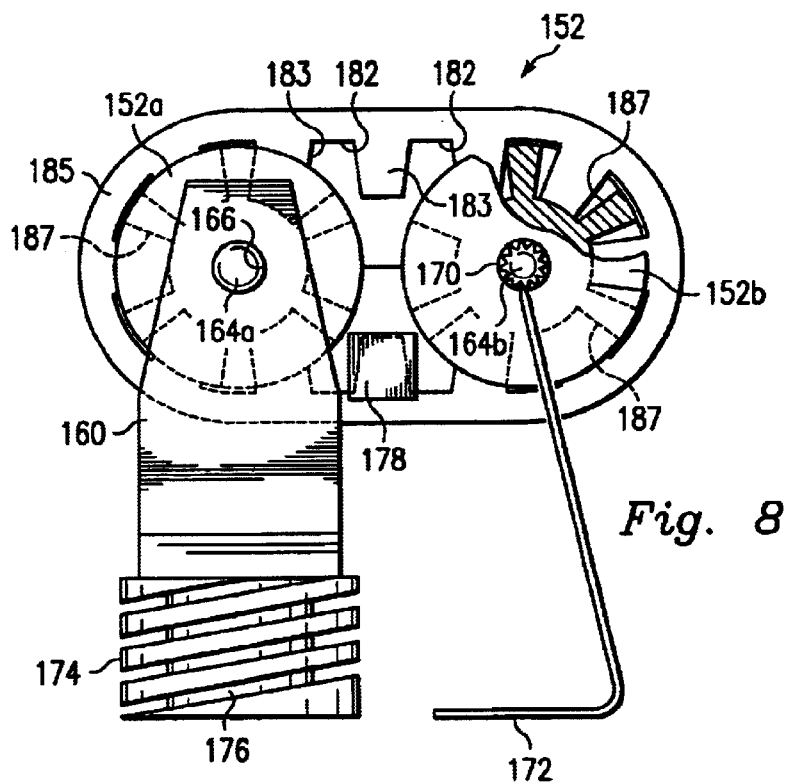
FIG. 8 is a side view further illustrating the embodiment of FIG. 7.

In another embodiment, FIGS. 7, 8 and 9, a scroll member 152 includes a first scroll wheel 152a rotatably mounted on a first axle 164a and a second scroll wheel 152b rotatably mounted on a second axle 164b. The first axle 164a rotatably supports first scroll wheel 152a in an opening 166 formed in a first mounting bracket 160. The second axle 164b rotatably supports the second scroll wheel 152b in an opening 167 formed in a second mounting bracket 162. The first axle 164a is also reciprocally mounted in a slot 168 formed in the bracket 162. Second axle 164b includes a plurality of teeth 170 formed thereon for engagement with a tactile probe 172 which is supported on mounting bracket 162.

A compression spring 174 is mounted on bracket 162 and is engaged with bracket 160 for urging bracket 160 away from bracket 162. A switch 176, mounted on bracket 162, engages bracket 160 when bracket 160 is depressed to compress spring 174. In this manner, bracket 160 is resiliently and reciprocally mounted in bracket 162. Functionally, scroll wheels 152a, 152b rotate relative to brackets 160, 162, and scroll wheel 152a reciprocates with bracket 160 relative to bracket 162.

A first sensor 178 is mounted on bracket 162 and a second sensor 180 is mounted on bracket 162 opposite sensor 178.

A plurality of openings 182 are provided between a plurality of spaced apart tabs 183 in a drive belt 185. Tabs 183 engage a plurality of mated slots 187 in each of the scroll wheels 152a, 152b so that the scroll wheels 152a, 152b rotate simultaneously. A frequency signal is generated in response to a sensed movement of tabs 183 and openings 182 relative to sensors 178 and 180.

As a result, one embodiment provides a computer comprising a base including an exterior surface, a keyboard mounted on the exterior surface, a palmrest area on the exterior surface adjacent the keyboard and a scroll member mounted in the exterior surface adjacent the palmrest area, the scroll member including a first portion protruding from the exterior surface, and a second portion extending through the exterior surface and recessed into the base, the scroll member being bi-directionally rotatable relative to the exterior surface and resiliently depressible into the base.

Another embodiment provides a computer system comprising a base including an exterior surface, a palmrest area on the exterior surface adjacent the keyboard, a microprocessor mounted in the base, a storage coupled to the microprocessor, a video controller coupled to the microprocessor, a memory coupled to provide storage to facilitate execution of computer programs by the microprocessor and an input coupled to provide input to the microprocessor, the input including a scroll member mounted in the exterior surface adjacent the palmrest area, the scroll member including a first portion protruding from the exterior surface, and a second portion extending through the exterior surface and recessed into the base, the scroll member being bi-directionally rotatable relative to the exterior surface and resiliently depressible into the base.

A further embodiment provides a method of providing input into a portable computer including providing a base having an exterior surface, mounting a keyboard on the exterior surface, forming a palmrest area on the exterior surface adjacent the keyboard, mounting a scroll member in the exterior surface adjacent the palmrest area, so that a first portion of the scroll member extends from the exterior surface and a second portion of the scroll member extends into the base, bi-directionally rotating the scroll member relative to the exterior surface and resiliently depressing the scroll member into the base.

As it can be seen, the principal advantages of these embodiments are that the scroll wheel is located on the palmrest in such a manner as to allow the user to quickly and easily switch between keyboard and scroll wheel as well as allow the user to comfortably actuate the wheel. The wheel shape will allow the user to quickly feel for the device rather than having to visually acquire it, thus allowing for less troublesome use. The proposed scroll wheel solution rotates for scrolling and depresses for middle button actuation. The wheel is coupled with sensing devices for button actuation and for speed, direction, and range of scroll wheel rotation. These input signals will then be delivered to the notebook computer causing the displayed content to be manipulated accordingly.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer comprising:
    a base including an exterior surface;
    a keyboard mounted on the exterior surface;
    a palmrest area on the exterior surface adjacent the keyboard;
    a stationary mounting bracket mounted in the exterior surface;
    a rotating-only scroll wheel mounted in the stationary mounting bracket;
    a reciprocably movable mounting bracket resiliently mounted in the stationary mounting bracket;
    a rotating and reciprocating scroll wheel mounted in the reciprocably movable mounting bracket;
    a belt rotatable engaged with the scroll wheels, the belt including a plurality of tabs separated by spaces between the tabs; and
    a pair of opposed sensors mounted on opposite sides of the belt, whereby rotation of the belt moves the tabs and spaces between the sensors for generating a frequency signal from the sensors.

2. The computer as defined in claim 1 further comprising:
    a switch mounted between the mounting brackets.

3. The computer as defined in claim 1 further comprising:
    a switch mounted between the mounting brackets for actuation in response to the reciprocably movable mounting bracket being moved toward the stationary mounting bracket.

4. The computer as defined in claim 1 wherein each scroll wheel is mounted on a respective axle.

5. The computer as defined in claim 1 further comprising:
    an axle supporting the rotating-only scroll wheel, the axle including a plurality of teeth; and
    a tactile probe mounted in the base and extending into engagement with the teeth providing a sense of feel to a user in response to rotation of the belt.

6. A computer system comprising:
    a base including an exterior surface;
    a palmrest area on the exterior surface adjacent the keyboard;
    a microprocessor mounted in the base;
    a storage coupled to the microprocessor;
    a stationary mounting bracket mounted in the exterior surface;
    a rotating-only scroll wheel mounted in the stationary mounting bracket;
    a reciprocably movable mounting bracket resiliently mounted in the stationary mounting bracket;
    a rotating and reciprocating scroll wheel mounted in the reciprocably movable mounting bracket;
    a belt rotatably engaged with the scroll wheels, the belt including a plurality of tabs separated by spaces between the tabs; and
    a pair of opposed sensors mounted on opposite sides of the belt, whereby rotation of the belt moves the tabs and spaces between the sensors for generating a frequency signal from the sensors.

7. The computer system as defined in claim 6 further comprising:
    a switch mounted between the mounting brackets for actuation in response to the reciprocably movable mounting bracket being moved toward the stationary mounting bracket.

8. A method of providing input into a portable computer comprising:
    providing a base having an exterior surface;
    mounting a keyboard on the exterior surface;
    forming a palmrest area on the exterior surface adjacent the keyboard;
    mounting a stationary mounting bracket mounted in the exterior surface;
    mounting a rotating-only scroll wheel in the stationary mounting bracket;
    resiliently mounting a reciprocably movable mounting bracket in the stationary mounting bracket;
    mounting a rotating and reciprocating scroll wheel in the reciprocably movable mounting bracket;
    rotatably engaging a belt with the scroll wheels, the belt including a plurality of tabs separated by spaces between the tabs; and
    mounting a pair of opposed sensors on opposite sides of the belt, whereby rotation of the belt moves the tabs and spaces between the sensors for generating a frequency signal from the sensors.

* * * * *